Figure 1:
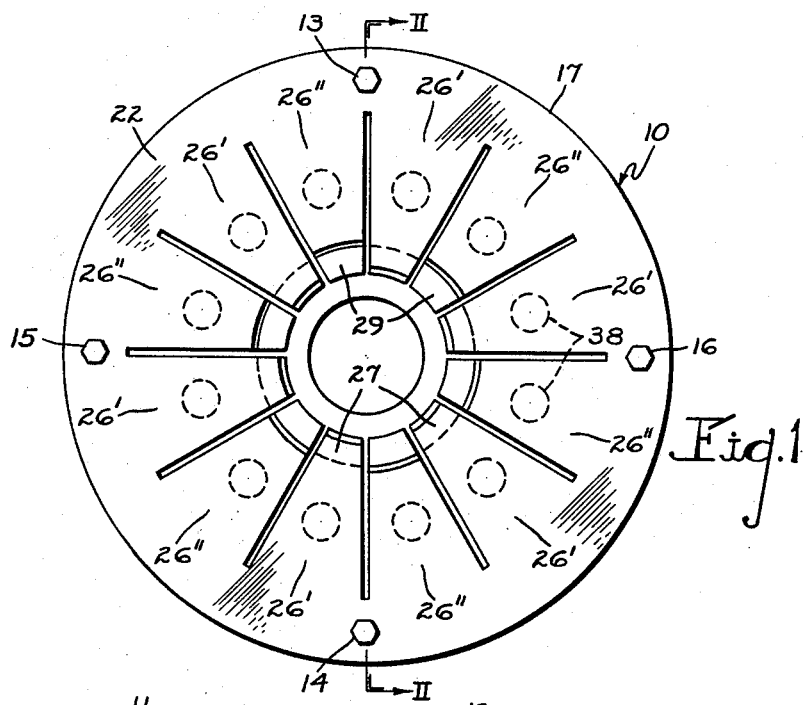

Feb. 10, 1959

R. S. HAHN 2,873,121

CHUCKING DEVICE

Filed Oct. 11, 1957

INVENTOR.
Robert S. Hahn
BY
Norman L. Blodgett
Attorney

United States Patent Office 2,873,121
Patented Feb. 10, 1959

2,873,121

CHUCKING DEVICE

Robert S. Hahn, Northboro, Mass., assignor to The Heald Machine Company, Worcester, Mass., a corporation of Delaware Application October 11, 1957, Serial No. 689,606

14 Claims. (Cl. 279—4)

This invention relates to a chucking device and more particularly to apparatus arranged to hold a workpiece during the formation of a surface of revolution thereon by internal grinding or the like.

In the past it has been common practice to hold workpieces by means of a so-called "diaphragm" chuck in which the jaws of the chuck extend outwardly of the surface of a thin metallic plate whose periphery is tightly clamped; buckling of the diaphragm causes inward and outward movement of the jaws and serves to clamp or release a workpiece held within the jaws. Considerable difficulty has presented itself in the use of this type of chuck. For one thing, the life of a diaphragm chuck is unpredictable and difficult to ascertain, particularly when it is operated frequently and continuously in a highspeed internal grinding machine or the like. This is caused not only by the bending stresses which arise in the diaphragm, but also because of the existence of circumferential and radial stresses known as membrane stresses. These circumferential and radial stresses add complexity to the problem of long life in a diaphragm chuck and they are not really necessary to the chucking problem. Furthermore, it is very difficult to design this type of chuck for a particular application and be sure that the yield point of the diaphragm is not met during operation. These and other difficulties explained with other art devices of this kind have been obviated in a novel manner by the present invention.

It is, therefore, an outstanding object of the invention to provide a chucking device similar to a diaphragm chuck but which is not subject to rapid destruction under frequent deflection.

A still further object of the invention is the provision of a chucking device which may be actuated in a relatively simple manner and which is particularly adapted to automatic operation of an internal grinding machine.

Another object of this invention is the provision of a chuck similar to a diaphragm chuck, which is inexpensive to manufacture, easy to maintain and which is capable of a long life of useful service.

It is a still further object of the present invention to provide a chucking device having relatively few moving parts which may be actuated in a simple manner from the outboard end of a work head to which the chuck is attached.

Another object of the instant invention is a provision of a chuck which has all the advantages of a diaphragm chuck but which is not subject to circumferential and radial stresses which make the life of the diaphragm difficult to ascertain; this same invention is of such a construction that the calculation of sizes adequate for a particular application are relatively simple and accurate.

Still another object of the invention is the provision of a very compact chucking device which, nevertheless, is capable of heavy-duty operation.

To the accomplishment of the foregoing and related ends, the invention, then, comprises the features hereinafter fully described and fully pointed out in the claims. The following description and the annexed drawings set forth in detail a certain illustrative embodiment of the invention, this being indicative, however, of but one of the various ways in which the principles of the invention may be employed.

Figure 2:
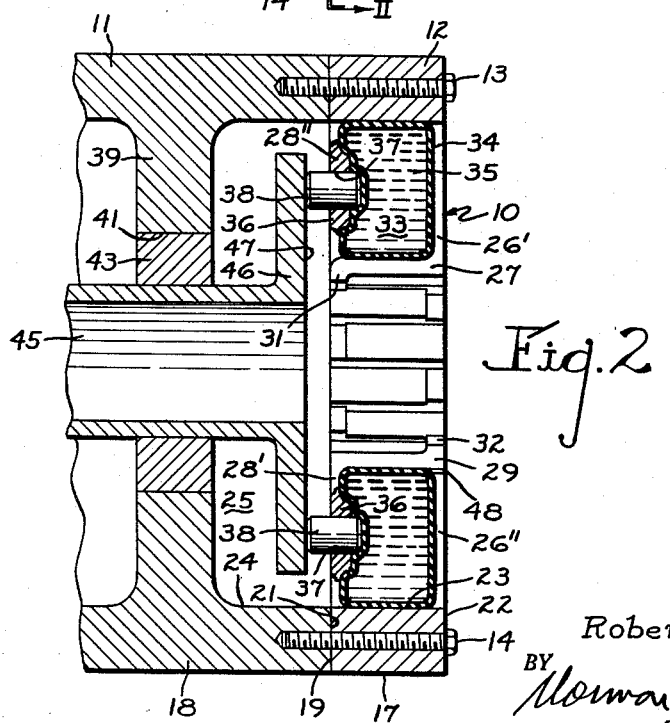

In said annexed drawings:

Figure 1 is a front, elevational view of a chucking device embodying the principles of the present invention as observed when looking in the direction of the axis of rotation of a workpiece mounted in a work head, and Figure 2 is a sectional, elevational view of the invention taken on the line II—II of Figure 1.

Referring to Figure 1, the chucking device, indicated generally by the reference 10, is shown mounted on a work head 11 of a machine such as an internal grinding machine. The chucking device comprises an annular ring 12 which is fastened to the work head by means of bolts 13, 14, 15 and 16. The work head 11 is capable of rotation about an axis constituting the major axis of the annular ring 12. This same axis is the axis about which the work piece is to be rotated while being subjected to a finishing operation or the like. The annular ring 12 is provided with a cylindrical outer surface 17 which, in a general way, constitutes an extension of a similar cylindrical surface 18 of the work head 11. The ring is provided with an inner plane surface 19 which resides at a right angle to the axis of rotation and is pressed firmly by the fastening bolts against a similar surface 21 of the work head 11. The outboard end of the ring 12 is defined by a plane surface 22 which lies at a right angle to the axis of rotation. The ring 12 is provided with a generally cylindrical inner surface 23 which, in a general way, constitutes an extension of a similar cylindrical surface 24 defining a recess 25 formed in the work head 11.

Extending radially inwardly of the ring 12 adjacent the outboard surface 22 is a first series of sector members 26. These members are formed integrally with the ring and are in the general shape of a trapezoid, the broad base being attached to the ring in the neighborhood of the inner cylindrical surface 23. In actual practice, these sector members would be formed by providing the ring 12 with a continuous diaphragm surface of uniform thickness by drilling a central hole in the diaphragm, and then by cutting slots from that hole outwardly toward the ring. The sector members are of uniform thickness from root to tip. Certain of the sector members, indicated by the reference numeral 26′, are provided with jaw members 27 while others of the sector members, numbered 26″, are not provided with such jaw members. At the other or inboard end of the ring 12 are situated a second series of similar sector members 28 some of which, numbered 28′, are provided with jaw members 29 and others, designated 28″, do not have such jaw members. The number of sector members 26 and the number of sector members 28 are exactly equal and each sector member of the first series is provided with a corresponding sector member at the other end of the ring 12. Furthermore, each sector member 26′ having a jaw member 27 is matched with a sector member 28″ which does not have a jaw member 29; in the same way each sector member 26″ which does not have a jaw member 27 is matched with a sector member 28′ which does have a jaw member 29. Since the sector members are separated by a very narrow gap the jaw members 27 and 29 form a cluster arranged in a circle and adapted to grasp a workpiece having a cylindrical outer surface. Each of the jaw members 27 and 29 extends from its respective sector member axially of the ring and terminates in the plane of its opposing sector member. For instance, the jaw member 27 extends from the inner end of the sector member 26; extends axially of the chucking device, and terminates in the plane of the surface 19, which is the inboard surface of the sector member 28''; in the same way, the jaw member 29 extends from the innermost end of the sector member 28' and extends axially of the chucking device and terminates in the plane 22 which is the outboard end of the ring 12 and the outer surface of the sector member 26''. Each of the jaw members 27 is provided with a small inwardly-directed, radial abutment 31 at the end which is adjacent the sector member 28'' while, in the same way, each of the jaw members 29 is provided with a short inwardly-directed, radial abutment 32 adjacent the sector member 26''.

The cylindrical surface 23 of the ring 12 and the inner surfaces of the sector members 26', 26'', 28' and 28'' along with the outwardly-directed surfaces of the jaw members 27 and 29 serve to define an annular chamber 33. Within this chamber is situated a flexible, impervious container 34 formed of rubber, neoprene, or the like. This bag is formed in a manner similar to an automobile inner tube but is shaped to conform closely to the defining surfaces of the chamber 33. Within the bag is enclosed a body 35 of a fluid which in the preferred embodiment is hydraulic oil. Each of the sectors 28' and 28'' is provided with a boss 36 through which extends a bore 37 carrying a cylindrical peg 38. Each peg is slidable in its bore and may be pressed in the axial direction against the outer surface of the bag 34 to produce a pressure effect on the body 35 of fluid in the chamber 33.

Extending across the work head 11 transversely of the axis of rotation is a web 39 having a bore 41 in which is fixed a bearing 43. The bearing has slidably mounted therein a tubular shaft 45 which extends axially therethrough. The tubular shaft 45 extends to a plane adjacent the chucking device 10 and is provided with an outwardly- and radially-extending flange 46 having a plane surface 47 which faces the chucking device. The flange extends out sufficiently to permit the plane 47 to contact each of the pegs 38. The other end of the tubular shaft 45 extends from the work head 11 and is provided with means, not shown, for selectively moving the shaft axially relative to the work head.

In the preferred embodiment the elements are so formed and configurated that when the pegs 38 are withdrawn from the bag 34 or the fluid 35 is not under pressure the abutments 31 spring outwardly and no clamping action takes place with respect to the cylindrical surface of the workpiece for which the chucking device was designed. When pressure is produced in the fluid, clamping action takes place on the workpiece. It will be understood also that the operating fluid in the body 35 does not necessarily have to be hydraulic oil. In some instances it may be preferable to use air and to produce the chucking action by means of pneumatic pressure. An observation of the drawings will show that in every case the sector member which does not have a jaw member comes within a short distance of the jaw member of its opposing sector member. For instance, in Figure 2 it can be seen that the sector member 26'' extends to within a short distance of the jaw member 29 but leaves a gap 48 therebetween to permit freedom of motion of the jaw member 29.

The operation of the chucking device will be readily understood in view of the above description. As has been stated, the chucking device 10 must be designed for a workpiece having a particular size of external or internal cylindrical surface so that, when there is no pressure in the fluid 35, the workpiece may be released. Presumably, and for purposes of description, let us assume that there is no pressure in the body 35 of fluid in the chamber 33, so that the jaw members 27 and 29 and their abutments 31 and 32, respectively, are withdrawn from the axis of rotation of the machine. The workpiece is inserted in the usual manner either by hand or by automatic feeding apparatus and then the shaft 45 is moved to the right in Figure 2 until the surface 47 of the flange 46 presses against the pegs 38 forcing them into the bag 34. This causes a displacement of the fluid in the chamber 33 and moves the sector members outwardly. The sector members 26' and 26'' move to the right in Figure 2 while sector members 28' and 28'' move to the left. It can be seen, then, that this causes the jaw members 27 and 29 to move in such a way that their abutments 31 and 32, respectively, move toward the axis of rotation and, if sufficient force is produced by means of the shaft 45, the workpiece will be clamped with an adequate amount of force to hold it during the machining operation. When the operation has been performed, the shaft 45 is withdrawn and the abutments 31 and 32 move away from the axis of rotation, thus releasing the workpiece.

It can be seen, then, that, while the action of the sector members is similar as a group to the action produced by the diaphragm of a diaphragm chuck, the stresses in the device are considerably different. The only stress on a sector member due to forces acting on it are bending stresses which may be approached by treating each sector member as a cantilever beam. The force in the fluid within the chamber 33 is uniform along the beam, thus producing a bending moment that is very simple to calculate. Furthermore, there are no forces in any of the sector members that are not necessary to the clamping action; that is to say, there are no significant stresses similar to the membrane stresses present in a diaphragm.

Other modes of applying the principles of the invention may be employed, change being made as regards the details described, provided the feature stated in the following claims or the equivalent of such be employed.

The invention having been thus described, what is claimed as new and desired to secure by Letters Patent is:

1. A chucking device comprising an annular ring, sector members lying in substantially the same plane and extending radially inwardly of the ring, a jaw member located on the inner end of each sector member, the jaw members extending in the same axial direction for substantial distances, the only connection of each sector member and its respective jaw member with the other sector and jaw members being through the annular ring, and means for deflecting the sector members simultaneously in the same direction to move the jaw members radially.

2. A chucking device comprising an annular ring, sector members lying in substantially the same plane and extending radially inwardly of the ring, the members being formed integrally with the ring, each sector member being in the general form of a trapezoid with its base adjacent the ring, a jaw member located on the inner end of each sector member, the jaw members extending in the same axial direction for substantial distances, the only connection of each sector member and its respective jaw member with the other sector and jaw members being through the annular ring, and means for deflecting the sector members simultaneously in the same direction to bring the jaw members together for clamping action.

3. A chucking device comprising an annular ring, sector members lying in substantially the same plane and extending radially inwardly of the ring, the members being formed integrally with the ring, a jaw member located on the inner end of each sector member, the jaw members extending in the same axial direction for substantial distances, the only connection of each sector member and its respective jaw member with the other sector and jaw members being through the annular ring, adjacent sector members being separated only by a narrow space, a membrane element lying along one side of the sector members and sealing the said narrow space, and fluid means acting against the membrane element for deflecting the sector members simultaneously in the same direction to bring the jaw members together for clamping action.

4. A chucking device comprising an annular ring, sector members lying in substantially the same plane and extending radially inwardly of the ring, the members being formed integrally with the ring, a jaw member located on the inner end of each sector member, the jaw members extending in the same axial direction for substantial distances, the only connection of each sector member and its respective jaw member with the other sector and jaw members being through the annular ring, the free end of each jaw member being provided with a radially inwardly-extending contact abutment, a means for deflecting the sector members simultaneously in the same direction to bring the jaw members together to cause the abutments to engage and clamp a workpiece.

5. A chucking device comprising an annular ring, sector members lying in substantially the same plane and extending radially inwardly of the ring, the members being formed integrally with the ring, a jaw member located on the inner end of each sector member, the jaw members extending in the same axial direction for substantial distances, the only connection of each sector member and its respective jaw member with the other sector and jaw members being through the annular ring, the ring and sector members forming part of the walls of an annular enclosure, and fluid pressure means acting within the enclosure for deflecting the sector members simultaneously in the same direction to bring the jaw members together for clamping action.

6. A chucking device comprising an annular ring, sector members lying in substantially the same plane and extending radially inwardly of the ring, the members being formed integrally with the ring, each sector member being in the general form of a trapezoid with its base adjacent the ring, a jaw member located on the inner end of each sector member, the jaw members extending in the same axial direction for substantial distances, the only connection of each sector member and its respective jaw member with the other sector and jaw members being through the annular ring, adjacent sector members being separated only by a narrow space, a membrane element lying along one side of the sector members and sealing the said narrow space, the free end of each jaw member being provided with a radially inwardly-extending contact abutment, the ring and sector members forming part of the walls of an annular enclosure for deflecting the sector members simultaneously in the same direction to bring the jaw members together to cause the abutments to engage and clamp a workpiece.

7. A chucking device having an axis comprising a first series of sector members extending radially in a first plane, a second series of sector members extending radially in a second plane spaced axially from the first plane, a jaw member located on one end of each sector member, the only connection of each sector member and its respective jaw member with the other sector and jaw members being through the annular ring, the jaw members of the first series extending axially and the jaw members of the second series extending axially in the opposite direction of that in which the jaw members of the first series extends, and means for deflecting the two series simultaneously in opposite directions to cause the jaw members to move radially for clamping action.

8. A chucking device comprising a tubular ring, a first series of sector members extending radially of the ring in the same general plane located at one end of the ring, a second series of sector members extending radially of the ring in the same general plane located at the other end of the ring, the sector members being formed integrally of the ring, each sector member being in the general form of a trapezoid with its base adjacent the ring, a jaw member located on the inner end of alternate sector members, the only connection of each sector member and its respective jaw member with the other sector and jaw members being through the annular ring, the jaw members associated with the first series extending axially to the plane of the said second series and the jaw members associated with the second series extending axially to the plane of the said first series, and means for deflecting the two series simultaneously to cause the jaw members to move radially for clamping action.

9. A chucking device comprising a tubular ring, a first series of sector members extending radially of the ring in the same general plane located at one end of the ring, a second series of sector members extending radially of the ring in the same general plane located at the other end of the ring, the sector members being formed integrally of the ring, a jaw member located on the inner end of each sector member, the only connection of each sector member and its respective jaw member with the other sector and jaw members being through the annular ring, the jaw members associated with the first series extending axially to the plane of the said second series and the jaw members associated with the second series extending axially to the plane of the said first series, adjacent sector members being separated by a narrow space, a flexible element lying along the sides of the surface facing each other and serving to seal the said narrow space, and fluid pressure means acting on the flexible members for deflecting the two series simultaneously to cause the jaw members to move radially for clamping action.

10. A chucking device comprising a tubular ring, a first series of sector members extending radially of the ring in the same general plane located at one end of the ring, a second series of sector members extending radially of the ring in the same general plane located at the other end of the ring, the sector members being formed integrally of the ring, a jaw member located on the inner end of each sector member, the only connection of each sector member and its respective jaw member with the other sector and jaw members being through the annular ring, the jaw members associated with the first series extending axially to the plane of the said second series and the jaw members associated with the second series extending axially to the plane of the said first series, the free end of each jaw member being provided with a radially-directed contact abutment, and means for deflecting the two series simultaneously to cause the jaw members to move radially to cause the abutments to engage and clamp a workpiece.

11. A chucking device comprising a tubular ring, a first series of sector members extending radially of the ring in the same general plane located at one end of the ring, a second series of sector members extending radially of the ring in the same general plane located at the other end of the ring, the sector members being formed integrally of the ring, a jaw member located on the inner end of each sector member, the only connection of each sector member and its respective jaw member with the other sector and jaw members being through the annular ring, the jaw members associated with the first series extending axially to the plane of the said second series and the jaw members associated with the second series extending axially to the plane of the said first series, the ring, sector members and jaw members forming an annular enclosure, means sealing the openings between the adjacent sector members and jaw members, and fluid pressure means acting within the annular enclosure for deflecting the two series simultaneously to cause the jaw members to move radially for clamping action.

12. A chucking device comprising a tubular ring, a first series of sector members extending radially of the ring in the same general plane located at one end of the ring, a second series of sector members extending radially of the ring in the same general plane located at the other end of the ring, the sector members being formed integrally of the ring, each sector member being in the general form of a trapezoid with its base adjacent the ring, a jaw member located on the inner end of alternate sector members, the only connection of each sector member and its respective jaw member with the other sector and jaw members being through the annular ring, the jaw members associated with the first series extending axially to the plane of the said second series and the jaw members associated with the second series extending axially to the plane of the said first series, adjacent sector members being separated by a narrow space, flexible elements lying along the sides of the series facing each other and serving to seal the said narrow space, the free end of each jaw member being provided with a radially-directed contact abutment, the ring, sector members and jaw members, forming an annular enclosure, the flexible members serving to seal the openings between the adjacent sector members and jaw members, and fluid pressure means acting on the flexible members within the said annular enclosure for deflecting the two series simultaneously to cause the jaw members to move radially to cause the abutments to engage and clamp a workpiece.

13. A chucking device comprising an annular ring, sector members lying in substantially the same plane and extending radially inwardly of the ring, the sector members being of uniform thickness throughout, a jaw member located on the inner end of each sector member, the only connection of each sector member and its respective jaw member with the other sector and jaw members being through the annular ring, the jaw members extending in the same axial direction for substantial distances, and fluid means providing uniform pressure over the entire area of each sector member for deflecting the sector members simultaneously in the same direction to cause the jaw members to move radially for clamping action.

14. A chucking device comprising a tubular ring, a first series of sector members extending radially of the ring in the same general plane located at one end of the ring, a second series of sector members extending radially of the ring in the same general plane located at the other end of the ring, the sector members being of uniform thickness throughout, a jaw member located on the inner end of alternate sector members, the only connection of each sector member and its respective jaw member with the other sector and jaw members being through the annular ring, the jaw members of the first series extending axially to the said plane of the second series and the jaw members of the second series extending axially to the plane of the said first series, and fluid means providing uniform pressure over the entire area of each sector member for deflecting the two series simultaneously to cause the jaw members to move radially for clamping action.

References Cited in the file of this patent

UNITED STATES PATENTS

| | | |
|---|---|---|
| 2,534,527 | Myers | Dec. 19, 1950 |
| 2,734,750 | Nyland | Feb. 14, 1956 |

FOREIGN PATENTS

| | | |
|---|---|---|
| 582,377 | Great Britain | Nov. 13, 1946 |